(12) United States Patent
Woodings et al.

(10) Patent No.: US 7,877,698 B1
(45) Date of Patent: Jan. 25, 2011

(54) SPECTRUM ANALYZER USER INTERFACE

(75) Inventors: Ryan Woodings, Boise, ID (US);
Christian Harrison, Salt Lake City, UT (US); Brian Tuttle, Meridian, ID (US)

(73) Assignee: Meta Geek, LLC, Boise, ID (US)

( * ) Notice: Subject to any disclaimer, the term of this patent is extended or adjusted under 35 U.S.C. 154(b) by 745 days.

(21) Appl. No.: 11/973,683

(22) Filed: Oct. 9, 2007

Related U.S. Application Data (60) Provisional application No. 60/850,052, filed on Oct. 6, 2006, provisional application No. 60/962,211, filed on Jul. 27, 2007.

(51) Int. Cl.
*G06F 3/048* (2006.01)

(52) U.S. Cl. .................. 715/764; 715/728; 715/781; 715/810; 715/866; 324/76.19; 324/76.12; 324/76.13; 324/76.22

(58) Field of Classification Search .............. 715/764, 715/728, 781, 810, 866; 324/76.19, 76.12, 324/76.13, 76.22
See application file for complete search history.

(56) References Cited

U.S. PATENT DOCUMENTS

| 5,177,560 | A | * | 1/1993 | Stimple et al. | 356/308 |
|---|---|---|---|---|---|
| 5,760,785 | A | * | 6/1998 | Barber et al. | 345/440 |
| 6,584,413 | B1 | * | 6/2003 | Keenan et al. | 702/28 |
| 7,459,898 | B1 | * | 12/2008 | Woodings | 324/76.19 |
| 2004/0028123 | A1 | * | 2/2004 | Sugar et al. | 375/224 |
| 2004/0047324 | A1 | * | 3/2004 | Diener | 370/338 |
| 2004/0095381 | A1 | * | 5/2004 | McDowell | 345/740 |
| 2004/0167727 | A1 | * | 8/2004 | Pickerd | 702/57 |
| 2005/0114801 | A1 | * | 5/2005 | Yang et al. | 715/961 |

* cited by examiner

*Primary Examiner*—Weilun Lo
*Assistant Examiner*—Rashedul Hassan
(74) *Attorney, Agent, or Firm*—Keller LaPuma Woodard PC (57) ABSTRACT

A system comprising user interface software configured to provide a plurality of spectral data display and manipulation options on a display displaying spectral data, a user interface processor configured to display a pictorial representation of the spectral data display and manipulation options, and a user interface instruction engine configured to provide a plurality of data display and manipulation instructions to the user interface processor to provide display and manipulation of the displayed spectral data. The plurality of data display and manipulation instructions are received from a control device connected to a computing system and the manipulation of the displayed spectral data is based on a user response to the displayed spectral data manipulation options or a pre-determined selection of the displayed spectral data display manipulation options.

18 Claims, 8 Drawing Sheets

SPECTRUM ANALYZER USER INTERFACE

CROSS REFERENCE TO RELATED APPLICATIONS

The present application claims the benefit under 35 U.S.C. §119 of U.S. Provisional Application Ser. No. 60/850,052 filed Oct. 6, 2006 and U.S. Provisional Application Ser. No. 60/962,211 filed Jul. 27, 2007. Said U.S. Provisional Application Ser. No. 60/850,052 filed Oct. 6, 2006 and U.S. Provisional Application Ser. No. 60/962,211 filed Jul. 27, 2007 are hereby incorporated by reference in their entirety.

FIELD OF THE INVENTION

The present invention relates generally to spectrum analyzers, and more particularly to a user interface for spectrum analyzers.

BACKGROUND OF THE INVENTION

Conventional spectrum analyzers lack certain spectrum display and data manipulation features, creating additional work for a user desiring a particular spectrum display or spectrum data manipulation. Consequently, it would be desirable to provide a system and method for enhanced graphical display and data manipulation for spectrum analysis.

SUMMARY OF THE INVENTION

Accordingly, the various embodiments of the present invention described are directed to a system for providing a user interface for enhanced graphical display processor configured to display a pictorial representation of spectral data and manipulation options, and a user interface instruction engine configured to provide a plurality of manipulation instructions to the processor to provide manipulation of the displayed spectral data. The manipulation instructions may be received from a control device connected to a computing system and the manipulation of the displayed spectral data may be based on a user response to the displayed data manipulation options or a pre-determined selection of the displayed data display and manipulation options. For instance, user interface system may provide a default display option based on pre-selected options selected by the system or by a user prior to utilizing the user interface system to display and manipulate spectral data.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
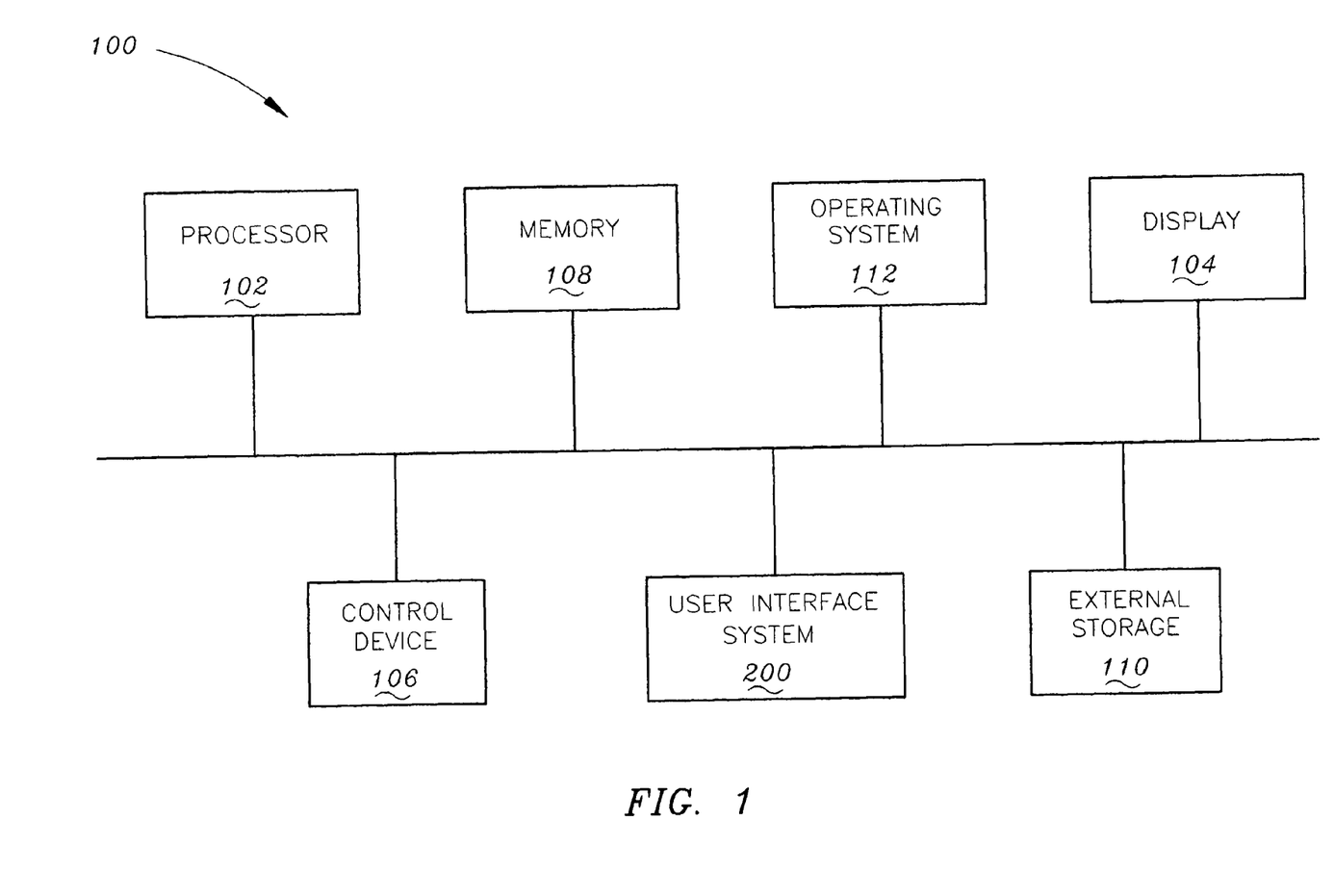
FIG. 1 illustrates a general purpose computer architecture 100 suitable for implementing embodiments of the present invention.

FIG. 1 illustrates general purpose computing system 100 suitable for implementing embodiments of the present invention. The general purpose computing system 100 comprises at least a processor 102, a display 104, a control device 106 and a user interface system 200 according to embodiments of the present invention. User interface system 200 may be controllable with the control device 106, such as a mouse, keyboard or touch sensitive screen or other such control device to manipulate text, images, and other objects on the display 104. These objects may include graphs, icons, windows, menus, and other images which may be displayed on the user interface. The general purpose computer 100 may also include memory 108, and may further comprise external storage 110. The general purpose computer 100 may include an operating system 112, such as Microsoft Windows, capable of executing programs, and applications. The components 102-112, 200 may be connected via a connection such as a bus 114. The system bus 114 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

As will be understood, embodiments of a user interface system 200 of the present invention may be in the form of a software program, a software object, a software function, a software subroutine, a software method, a software instance, a code fragment, a hardware operation or user operation, singly or in combination. Embodiments of the user interface system 200 are thus executable on any general purpose computing architecture such as the general purpose computing system 100 of FIG. 1, but there is clearly no limitation that this architecture is the only one which can be used in implementing embodiments of the present invention.

In one embodiment, the user interface system 200 of the present invention is configured as a software program which, according to different embodiments, is capable of functioning with an existing GUI, by modifying an existing GUI's toolkit, or as a standalone configuration. The components of the general purpose computer 100 are interconnected through appropriate interfaces to a bus. It will be appreciated that the computing system 100 as illustrated is merely representative and the included components are likewise representative and not meant to be exhaustive.

Figure 2:
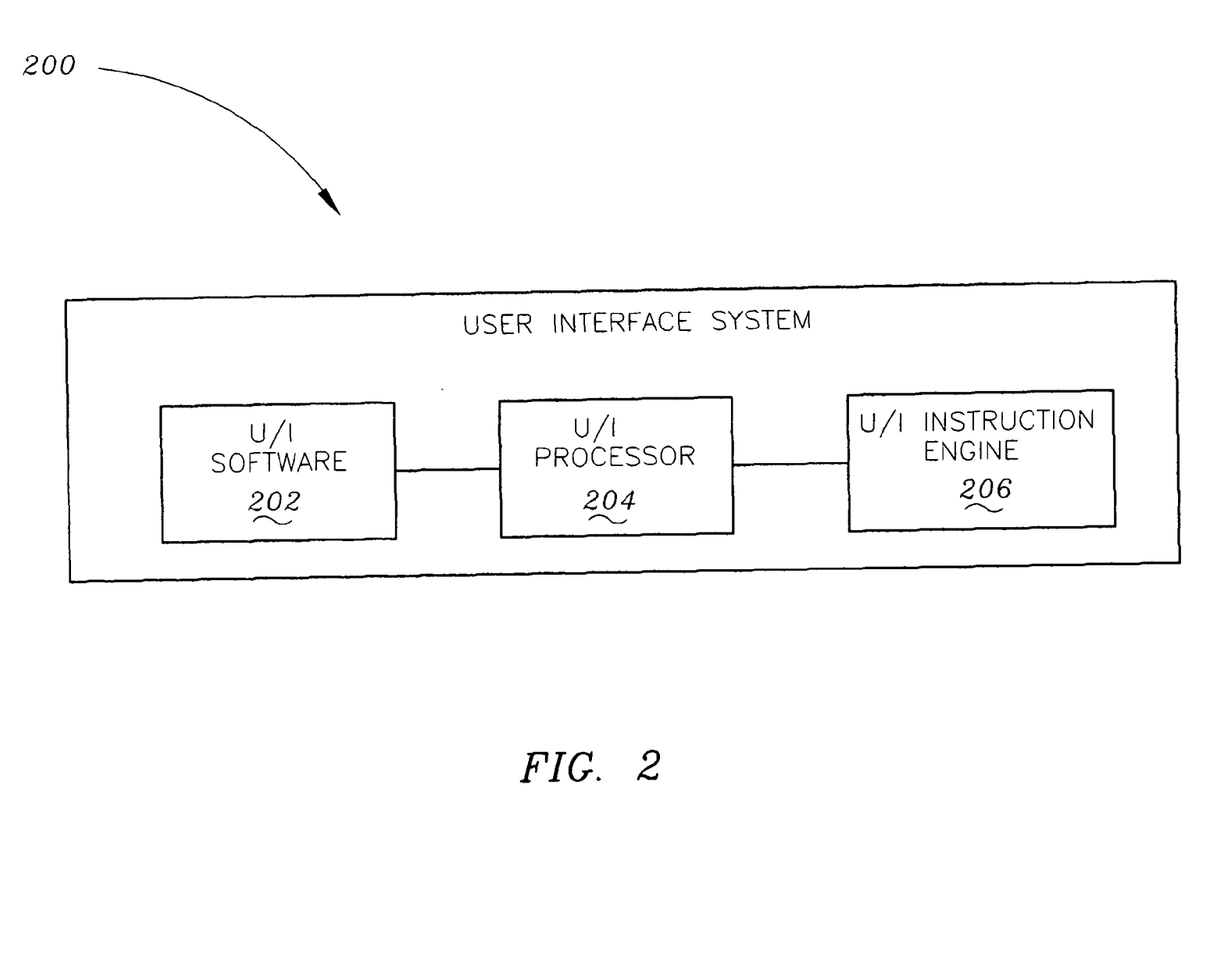
FIG. 2 a block diagram illustrating a system for enabling user interaction with spectrum analysis computer software running on a computer system configured to display spectrum analysis data on a display device in accordance with an exemplary embodiment of the present invention.

Referring to FIG. 2, a block diagram illustrating a system 200 for enabling user interaction with spectrum analysis computer software running on a computer system configured to display spectrum analysis data on a display device. User interface system 200 comprises user interface software 202 configured to provide a plurality of spectral data display and manipulation options on a display displaying spectral data, a user interface processor 204 configured to display a pictorial representation of spectral data and manipulation options, and a user interface instruction engine 206 configured to provide a plurality of manipulation instructions to the processor 204 to provide manipulation of the displayed spectral data. The manipulation instructions may be received from a control device connected to a computing system and the manipulation of the displayed spectral data may be based on a user response to the displayed data manipulation options or a pre-determined selection of the displayed data display and manipulation options. For instance, user interface system 200 may provide a default display option based on pre-selected options selected by the system or by a user prior to utilizing the user interface system to display and manipulate spectral data.

Figure 3A:
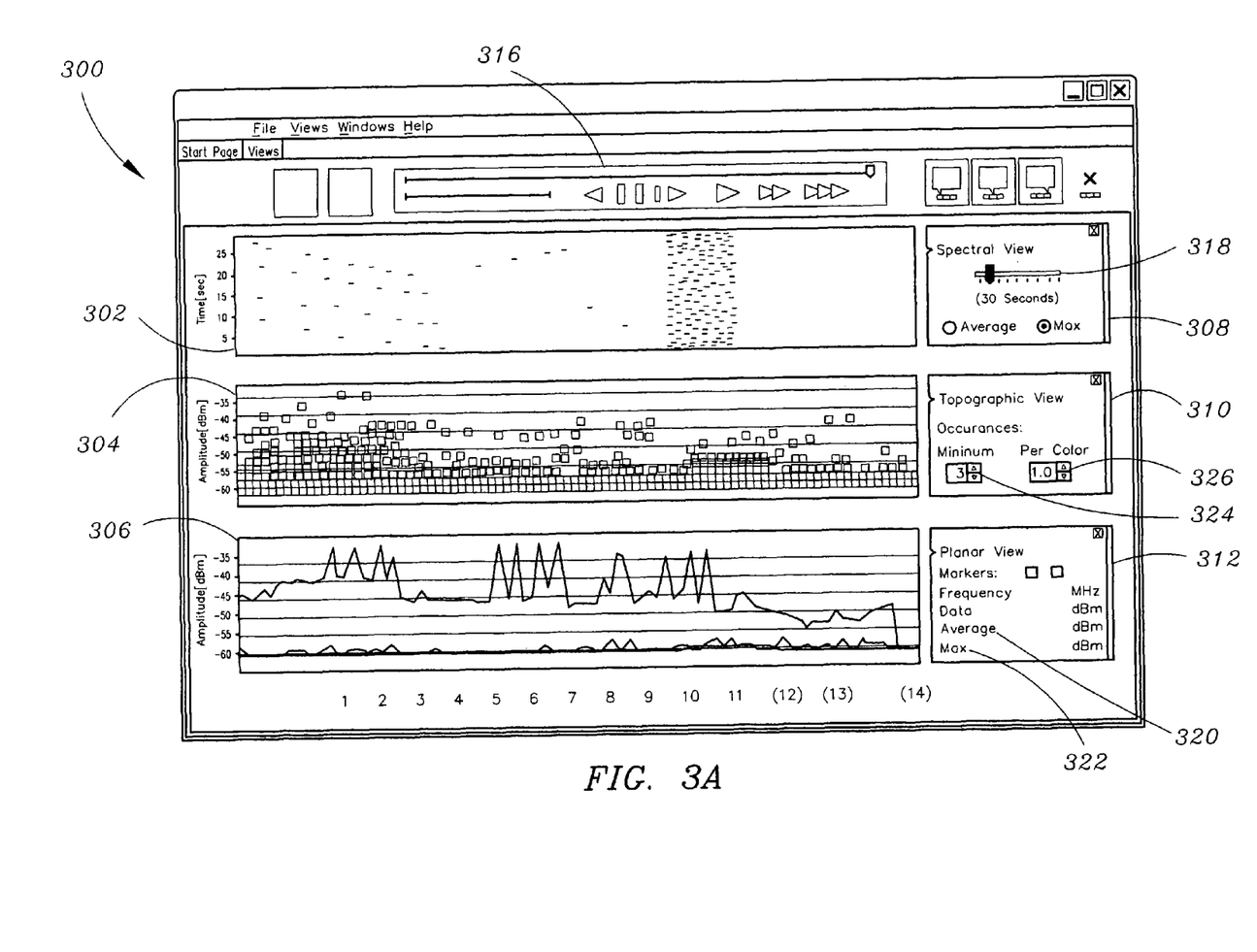
FIGS. 3A and 3B are illustrations of screens displayable by a user interface system utilized for analyzing detected frequency spectrum data in accordance with an exemplary embodiment of the present invention is shown.
Figure 3B:
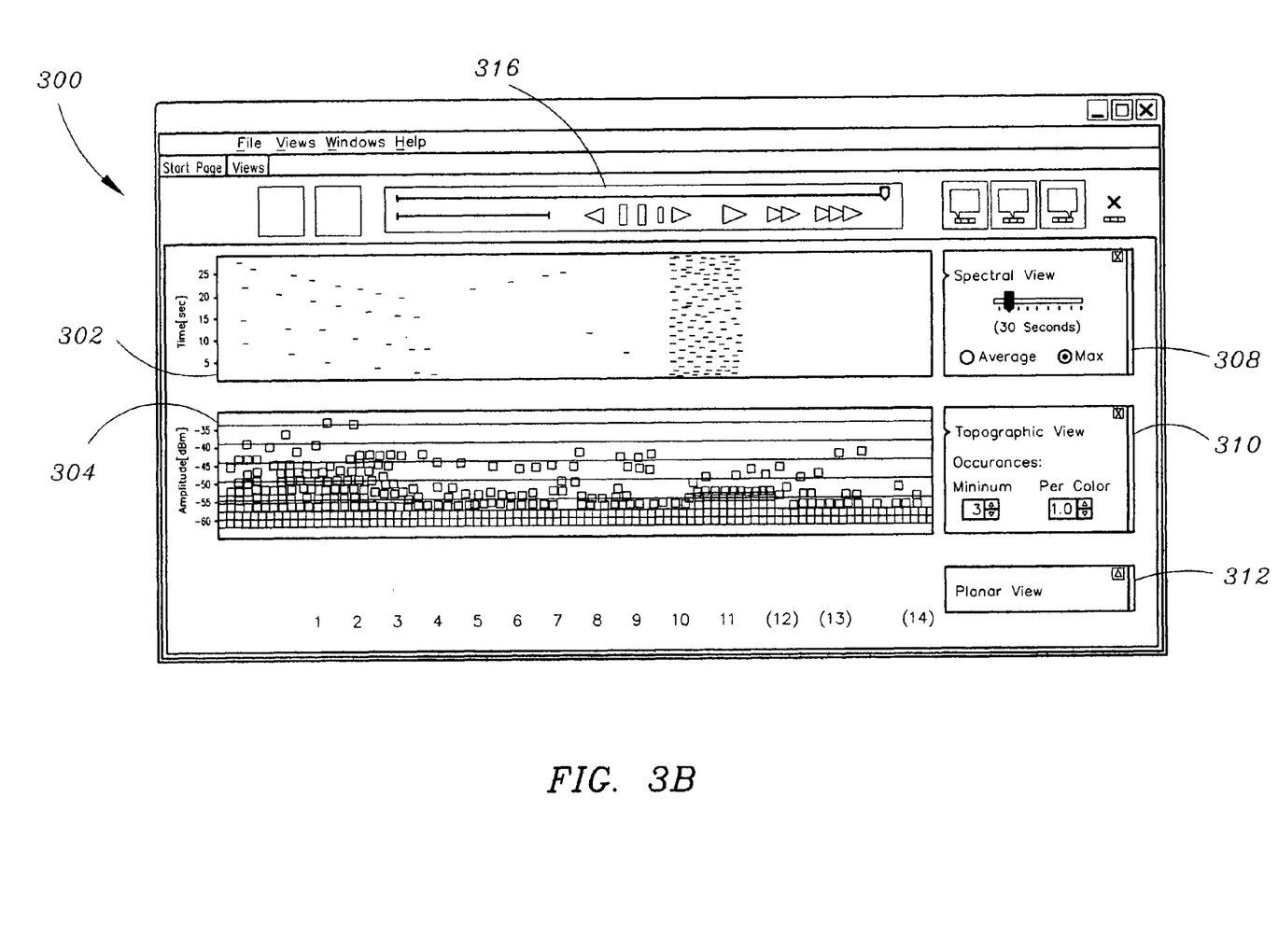

Referring to FIG. 3, an illustration of a screen 300 displayable by a user interface system 200 utilized for analyzing detected spectrum data in accordance with an exemplary embodiment of the present invention is shown. User interface system 200 may provide collapsible controls or groups of controls. Collapsible groups of controls may expand and contract to display or hide the controls in the group. In applications where a group of controls corresponds to other data in the application that may be displayed or hidden, the state of the collapsible panel of controls may be used to control whether the other data is displayed or not. For example, referring to FIG. 3A, three graphs 302, 304, 306 are displayed on the left and a group of controls 308, 310, 312 are displayed to the right of each graph. In the embodiment shown, control groups may be a spectral view control group 308, a topographical view control group 310 and a planar view control group 312, corresponding respectively to a spectral view graph 302, a topographic view graph 304 and a planar view graph 306. Planar view graph 306 may also be referred to as a two dimensional or linear spectral graph. Referring to FIG. 3B, user interface system 200 may provide a display option where the title and/or icon of one group, such as planar view of group 312, is displayed if the group of controls is in a collapsed mode. If a group of controls is collapsed, a corresponding graph does not display. The group of controls may be expanded, such as via an expansion icon 314, allowing the corresponding graph, such as 306, to be displayed. State of collapsible group of controls information may be utilized to determine the state of other displayed information related to that group of controls. Specifically using the state of groups of controls may be utilized to determine the state of displayed graphs for spectrum analyzers.

User interface system 200 may provide a playback options interface 316 configured to provide playback options such as pause, rewind, advance, live playback of a data stream and the like. User interface system 200 playback options interface 316 may be configured to display instantaneous data, and allow a user to pause the display, rewind the data to review previous data segment, and to advance forward or skip to a later data segment, up to the instantaneous data, after reviewing the information. Playback options interface 316 allows the user to review past data without requiring the user to explicitly record the data to a file.

User interface system 200 may provide a spectral view 302 of data to be analyzed. Spectral view control group 308 may provide a time scale adjustment control 318 suitable for adjusting the time scale that is displayed. For example, the spectrograph may display a few seconds of data or a few hours of data. As the user adjusts the time scale, the user interface system 200 may update the spectrograph in real-time to show the information for the desired amount of time.

User interface system 200 may also control a time position by providing a scrolling spectral view. View of spectral analysis data may be provided as a waterfall type spectrograph. In a waterfall type spectrograph, time may be graphed on one axis (spectral view). User interface system 200 may provide control of the current time position by providing scrolling of the spectral view. User interface system 200 may comprise a scroll bar, a keyboard shortcut, or a mouse scroll wheel to allow for spectral view scrolling. Scrolling the spectral view may then control the current time position of the data being displayed, allowing a user to traverse forward or backward through the data.

Figure 5:
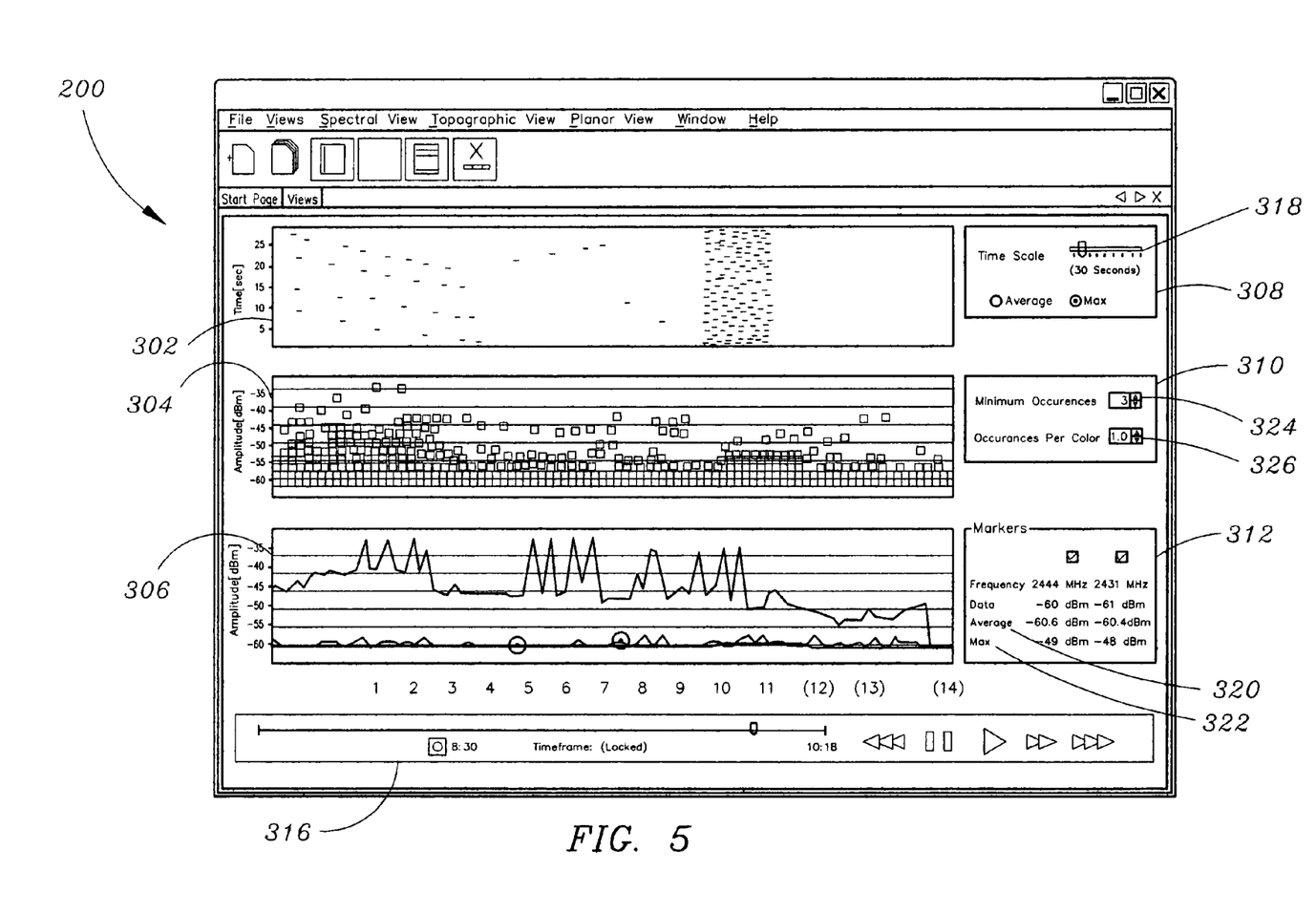
FIG. 5 is an additional illustration of an analysis of detected frequency spectrum data displayable by a user interface system in accordance with an exemplary embodiment of the present invention.

As shown in FIGS. 3A, 3B and FIG. 5, user interlace system 200 may provide a set of user selectable features to allow a user to select from the plurality of features to display, such as the average amplitude 320 or the maximum amplitude 322.

User interface system 200 may further provide a topographic view 304 for a user. User interface system 200 may provide a display of a frequency versus amplitude plane divided into a grid containing a plurality of frequency-amplitude pairs. User interface system 200 may track how often an RF signal matches each frequency/amplitude pair. User interface system may provide a color gradient configured to identify high occurrences of a frequency/amplitude pair versus low occurrences of a frequency-amplitude pair. For example, a first color, such as black, may represent frequency-amplitude pairs that never occur, a second color, such as blue, may represent frequency-amplitude pairs that rarely occur, and a third color, such as red, may represent frequency-amplitude pairs that occur regularly.

The user interface system 200 topographic view control group 310 may provide adjustment capabilities, such as adjustment of the minimum number of occurrences of a frequency-amplitude 324 pair before the frequency-amplitude pair is marked. The user may also adjust the maximum number of occurrences the user desires to analyze, and each frequency-amplitude pair occurring at least the desired number of instances may be similarly distinguished, such as colored with a single color 326. The color gradient may then be scaled between the minimum and maximum number of occurrences that the user is interested in. User interface system 200 may also provide scaling of the color gradient based on the number of occurrences each specific color in the gradient represents. User interface system 200 may also display amplitude color based on the number of occurrences of a frequency, utilized "weather map" colors to indicate "hold" spectral regions, i.e., regions of high spectral activity, and "cold" spectral regions, i.e., regions of low spectral activity. User interface system 200 may also allow a user to control minimum number of occurrences of a frequency to display and adjust the one or more display colors (such as occurrences per color).

User interface system 200 may provide a topographic view 304 utilizing a plurality of colors 326 to symbolize the respective popularities (i.e., the duty cycle or number of occurrences of a frequency) of each of a plurality of frequency-amplitude points. It is contemplated that, subject to the input data, the maximum popularity of a point may range from 0% to 100%. Additionally, the input data for a given location may vary such that the popularity of points is constantly changing. By analyzing the data for all frequency-amplitude points in view, the color scheme may be automatically scaled and/or adjusted to show the largest color range possible for the given input data. In other words, the color scheme may be scaled to match the input data.

Spectral analysis data may be viewed based on a plurality of distinct timeframes, ranging, in one embodiment from approximately a few seconds to multiple hours. Each view may display data for a different time interval, or timeframes of all views may be unified such that an individual view of a timeframe is a different view of the same data shown in any other of the plurality of views.

User interface system may provide a plurality of recording options for captured and displayed spectral data. A recorded timeframe may be entirely displayed when cropping the timeframe for analysis. By displaying the data from the entire recording, a user may quickly determine the desired timeframe for the clipping or cropping. For example, user interface system 200 may allow user adjustment of one or more recording times, such as the beginning and end times of a clipping, and the user interface system 200 may adjust to display the data contained with the currently selected timeframe.

User interface system 200 may provide relative advance or rewind speeds based on a displayed timeframe. Typical video playback displays a fraction of data at a given time interval. However, user interface system 200 may provide spectral analysis data display for any particular amount of time. For example, user interface system 200 may display a range of data ranging from approximately 15 seconds to 1 hour of data simultaneously. User interface system 200 may provide adjustment of the advance and rewind speeds in relation to the timeframe in view to allow the spectral analysis data to be scanned relatively quickly in either forward or reverse. For example, if 1 minute of data is displayed the fast forward speed may be 2×, but if 15 minutes of data is displayed the fast forward speed may be 30×, allowing the data in view to completely refresh at a relatively equal rate regardless of timeframe length.

Figure 4:
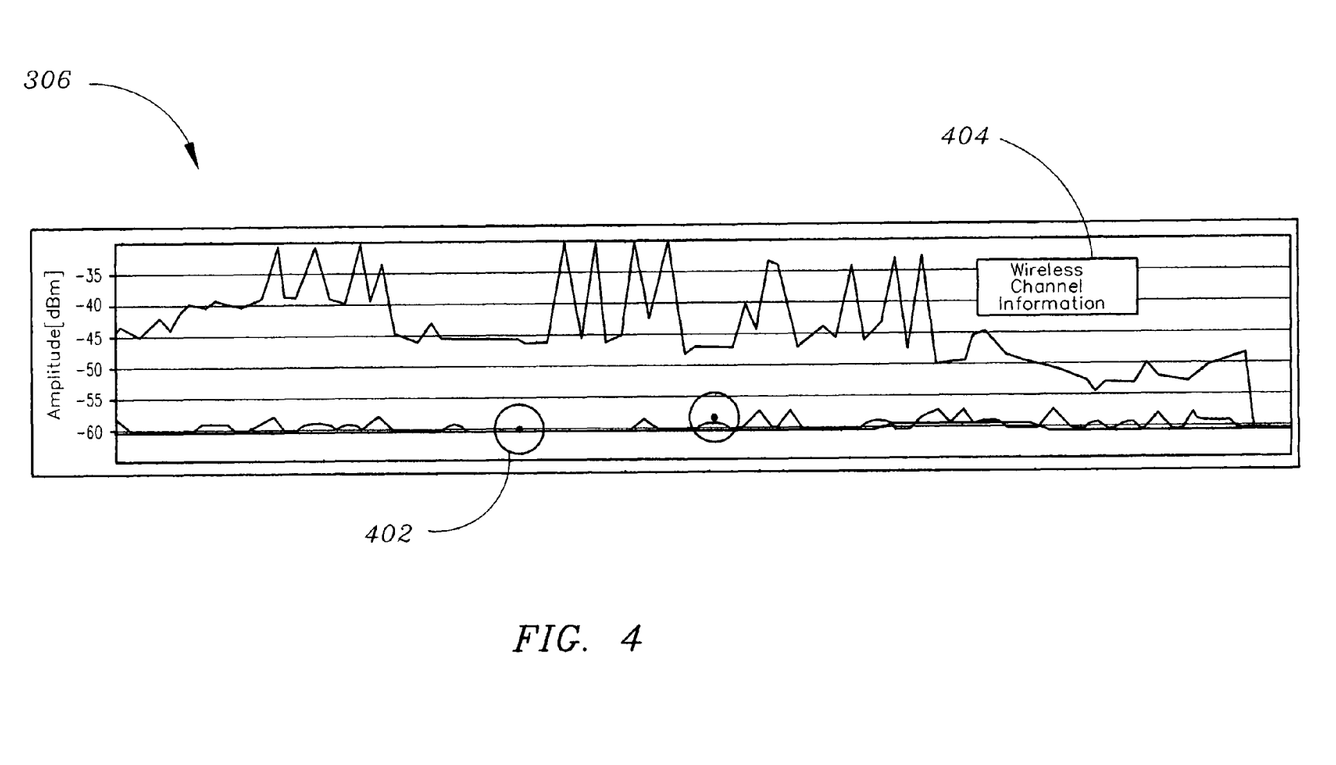
FIG. 4 is an illustration of an analysis of detected frequency spectrum data displayable by a user interface system in accordance with an exemplary embodiment of the present invention.

Referring to FIG. 4, an illustration 306 of an analysis of detected frequency spectrum data displayed on a graphical user interface of a user interface system 200 in accordance with an exemplary embodiment of the present invention is shown. User interface system 200 may provide a marker 402 on the display that may be moved across an axis, such as a frequency axis (typically x-axis). Pertinent information related to that frequency may then be displayed, such as current, average, and maximum amplitudes. The marker 402 may be centered vertically at the current amplitude of that frequency and thus traverse up and down the y-axis based on the amplitude of that frequency. User interface system 200 may provide marker location to facilitate locating a marker on the display or to following the marker as it is moved left and right across frequencies. In one embodiment, user interface system 200 may be configured to gray out or dim all or substantially all of the background surrounding the marker, allowing the marker 402 to appear brighter. User interface system 200 may also be capable of brightening the marker 402 to provide enhanced visibility for the marker 402.

With continued reference to FIG. 4, user interface system 200 may be configured to display an information overlay 404 over the displayed spectral data. For example, when a wireless or Wi-Fi network is displayed, user interface system 200 may display wireless or Wi-Fi channel and network information overlaid on the displayed network. Information may be grouped together into desired groups, and each group of data may be displayed when relevant or desired to be displayed and hidden irrelevant, less useful than other groups of information, or desired to be hidden. The information groups may be overlaid on raw spectrum analyzer data, allowing the user to view the data in layers, where each layer may be turned on or off allowing simultaneous viewing of any number of layers based on the user's current task. Determining which layers are displayed at any given time may either be manually controlled by the user or automatically selected by the user interface system 200 system based on the current task or user preferences.

Referring to FIG. 5, a graphical user interface system 200 for a spectrum analyzer illustrating a spectrographic view, topographic view (as described above), and a planar view graph simultaneously is shown. User interface system 200 may display spectral view, topographic view, and planar view and any other view simultaneously (or any 1-2 of these views simultaneously) in vertical arrangement so frequencies line up vertically. For instance, in one embodiment, the plurality of graphs may be arranged to provide a frequency axis configured to line up with respect to the plurality of displayed graphs. A user may gather data from all graph types or a subset of displayed graph types simultaneously and to easily correlate data between graphs due to the aligned frequencies.

User interface system 200 may provide auto-adjustment of an amplitude range in the spectrum analyzer to provide a user with all data in view while minimizing screen space occupation screen space.

Spectral analysis data is typically a measurement of the signal strength (amplitude) of a specific frequency. However a user may not require amplitude data of any single frequency. Rather the user may require or desire to analyze the amplitude of a section of frequency, such as a wireless or Wi-Fi channel. By aggregating the data for the entire frequency range contained in a wireless or Wi-Fi channel the user interface system 200 may provide such information as the average and maximum amplitude for the entire channel. Also the user interface system 200 may automatically select between showing raw frequency information and showing channel information based on user settings and/or current display settings. For example, if the x-axis is displaying frequency information, frequency-specific metrics may also be displayed. If the x-axis is displaying channel information, channel-specific metrics may also be displayed.

User interface system 200 may also be configured to provide an aggregated display from multiple spectrum analyzers. Aggregated display may be provided to a user monitoring multiple remote spectrum analyzers. Data may be aggregated from multiple analyzers into a single interface to allow the user to compare the data from various analyzers, as well as simultaneously monitor multiple analyzers without continuously switching windows (tabs, etc). Aggregated data may be used to monitor a wider frequency band than may be analyzed by a single spectrum analyzer at, for instance, a given frequency step size, resolution bandwidth, and sweep time). The aggregated data may also be utilized to monitor a larger physical area than a single spectrum analyzer may monitor. Multiple spectrum analyzers connected to a single monitoring application may be utilized to triangulate a signal source to determine its exact location. By aggregating data from multiple spectrum analyzers and triangulating signal sources it is then possible to create three dimensional maps of signal sources and signal strengths.

Figure 6:
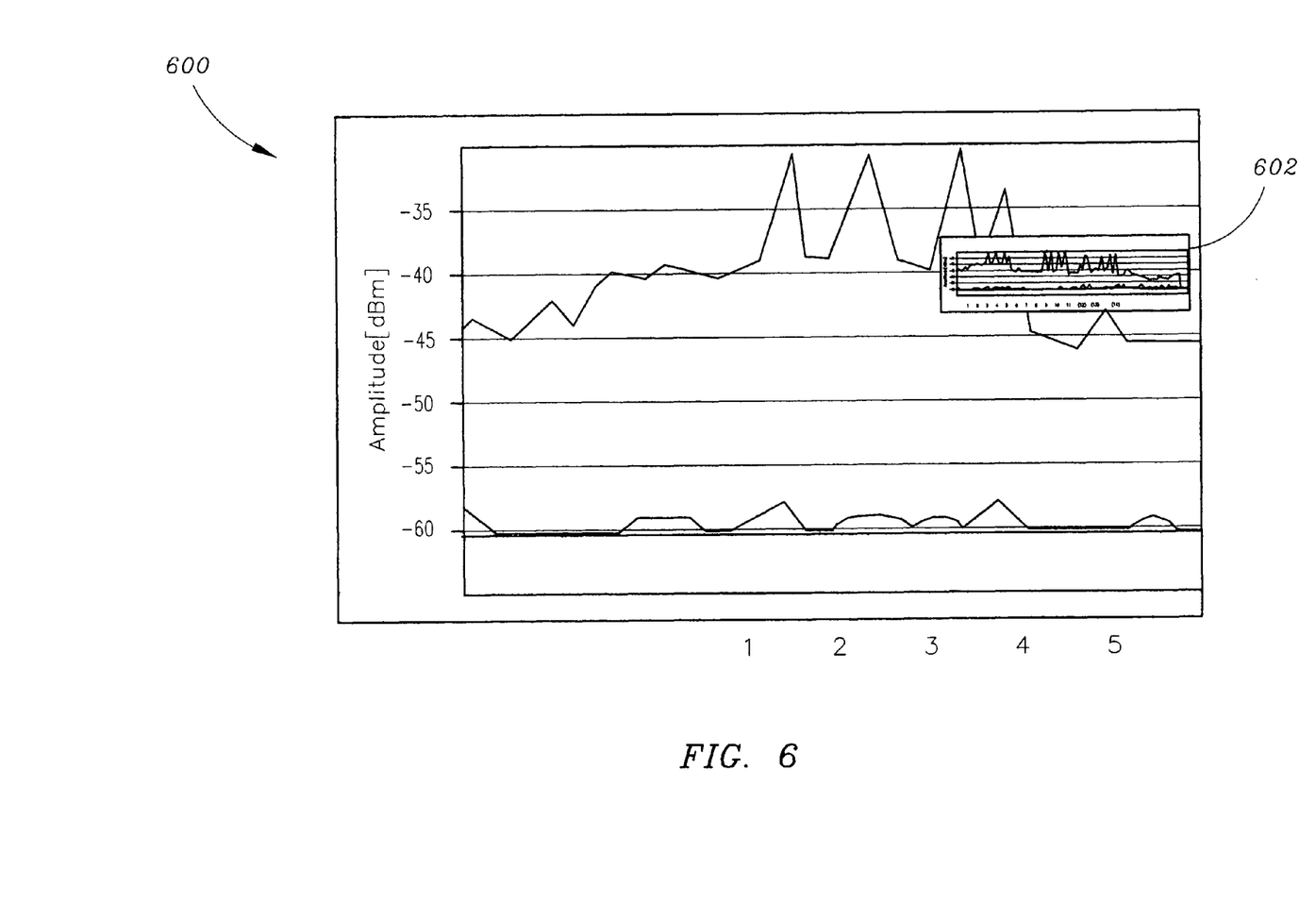
FIG. 6 is an illustration of a time bar suitable for display on a user interface in accordance with an exemplary embodiment of the present invention.

Referring to FIG. 6, a further additional view 600 of a display provided by a user interface system 200 according to exemplary embodiments of the present invention is shown. User interface system 200 may provide a magnification function configured to magnify a selected area of the spectrum analyzer display. When analyzing spectrum analyzer data, it may be useful to examine a small area of data in greater detail. Magnification view may display an enlarged view of a subset of data as well as display additional information regarding the subset of data, such as average, current, and maximum amplitudes of the frequency/channel being magnified. User interface system 200 may provide a user with an overview when the user interface is zoomed in displaying a detailed view. For instance, when a user zooms in to a narrow band, such as between channels 1-5, as shown in FIG. 6, the user interface system 200 may capture a wider band of data on a periodic basis to provide an overview. For example, 1 in every 10 frequency sweeps may sweep the wider band so that the narrow band is very detailed, but enough information is gathered to display a basic overview. The wide-band overview may be displayed in a small window 602 within the window displaying the detailed view. The smaller within display window 602 may also be configured to display a different narrow frequency band, or other such data as desired by a user. For example, the user interface system 200 may display a detailed view of 802.11b channel 2 and the smaller within display window may display activity occurring on 802.11b channel 11.

Figure 7:
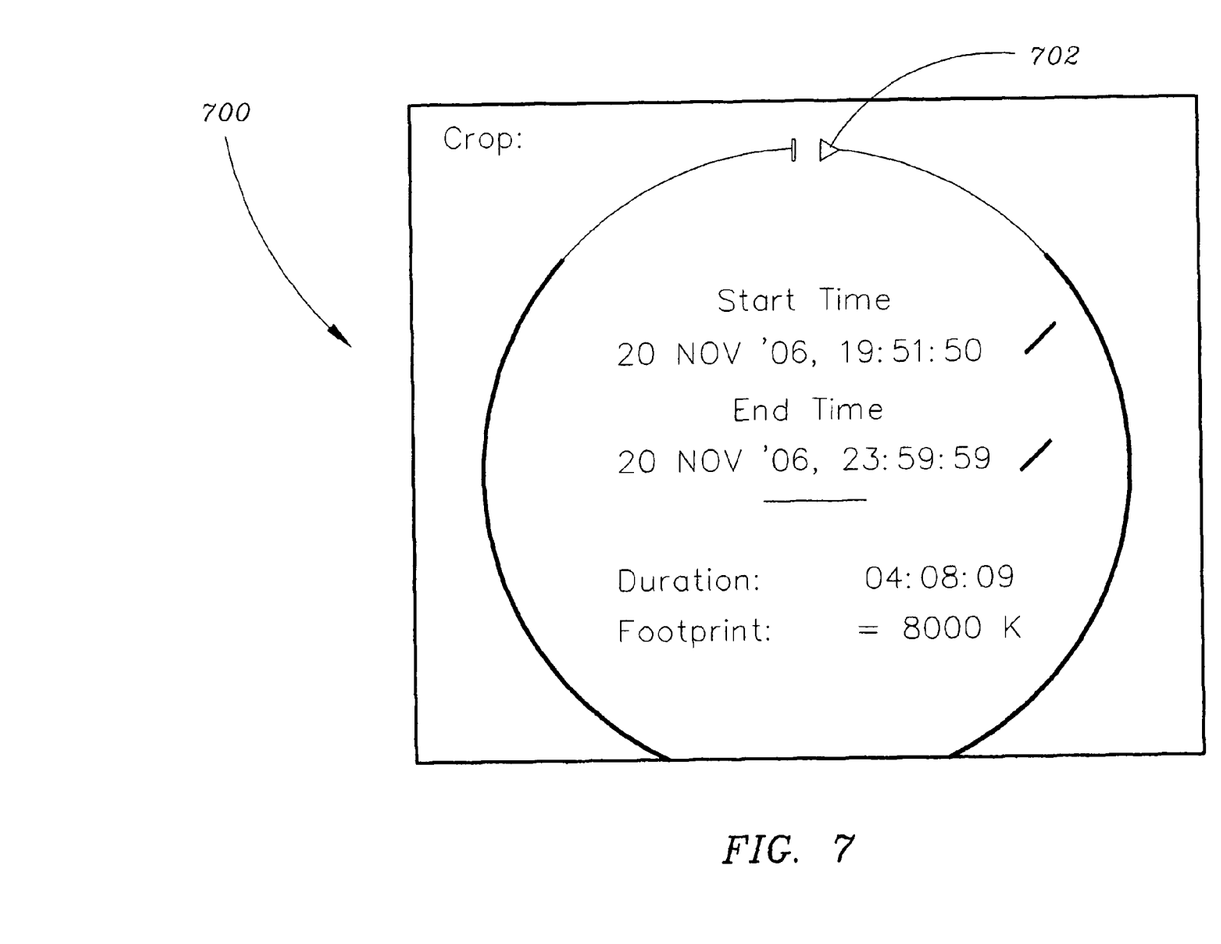
FIG. 7 is an illustration of a circular time bar 700 generated by the user interface system according to exemplary embodiments of the present invention.

Referring to FIG. 7, an illustration of a circular time bar 700 generated by the user interface system 200 according to exemplary embodiments of the present invention is shown. User interface system 200 may provide a circular time bar 700 for cropping a data file. Circular time bar 700 may comprise one or more controls 702 configured to select the beginning and end times of the desired cropping, providing fine precision cropping without requiring the full horizontal space of a straight, horizontally configured or vertically configured time bar.

Systems and apparatuses provide an improved graphical user interface for spectrum, frequency and channel analysis and improved spectrum, frequency, and channel analysis. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

Various embodiments of the present invention include one or more techniques described below relating to improved spectrum and channel display and manipulation. Each of these techniques may be implemented using standard user interface techniques, such as standard graphical software programming or the like. Of course any programming language or environment may be used to implement the techniques described herein.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is utilized to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages.

What is claimed:

1. A system comprising:
    a computer-readable storage medium storing user interface software configured to provide a plurality of spectral data display and manipulation options on a display displaying spectral data, wherein the plurality of spectral data display and manipulation options comprises providing a circular time bar display configured for cropping a data file;
    a user interface processor configured to display a pictorial representation of the spectral data display and manipulation options on a display; and
    a user interface instruction engine configured to provide a plurality of data display and manipulation instructions to the user interface processor to provide display and manipulation of the displayed spectral data, wherein the plurality of data display and manipulation instructions are received from a control device connected to a computing system and the manipulation of the displayed spectral data is based on a user response to the displayed spectral data manipulation options or a pre-determined selection of the displayed spectral data display manipulation options.

2. The system of claim 1, wherein the plurality of data display and manipulation options comprise a plurality of collapsible control groups configured to expand and contract to display or hide a set of controls located within on of plurality of collapsible control groups.

3. The system of claim 1, wherein the plurality of data display and manipulation options comprise a playback options interface configured to provide playback options including pause, rewind, advance, and live playback of the displayed spectral data.

4. The system of claim 1, wherein the plurality of data display and manipulation options comprises a spectral view of the displayed spectral data and a spectral view control group configured to provide a time scale adjustment of a displayed time scale.

5. The system of claim 1, wherein the plurality of data display and manipulation options comprises a plurality of recording options for captured and displayed spectral data.

6. The system of claim 1, wherein the plurality of data display and manipulation options comprises providing a marker on the display vertically centered at a selected amplitude of a frequency and configured to traverse at least one axis of a graph of the displayed spectral data.

7. The system of claim 6, wherein the plurality of data display and manipulation options comprises substantially dimming a display background to provide a brighter marker appearance relative to the display background.

8. The system of claim 1, wherein the plurality of data display and manipulation options comprises providing an information overlay configured to display over the displayed spectral data.

9. The system of claim 1, wherein the plurality of data display and manipulation options comprises providing an aggregated display from a plurality of remotely located spectrum analyzers.

10. A system comprising:
a computer-readable storage medium storing one or a plurality of software programs for controlling a user interface for analyzing spectral data;
a user interface for receiving input of parameters for performing control of a captured spectral data range or analysis of the spectral data range, the user interface configured to provide a plurality of spectral data display and manipulation options, receive a plurality of spectral data display and manipulation instructions and provide a real time display of the spectral data range manipulated according to the received plurality of spectral data display and manipulation instructions,
wherein the plurality of spectral data display and manipulation options comprises providing a circular time bar display configured for cropping a data file.

11. The system of claim 10, wherein the user interface is configured to provide a simultaneous display of plurality of graphs representing the captured spectral data range and align the plurality of graphs with respect to at least one axis of the plurality of graphs.

12. The system of claim 10, wherein the user interface is configured to provide a detailed view display of a portion of the captured spectral data range and an inset overview display of the captured spectral data range.

13. The system of claim 10, wherein the user interface is configured to provide a plurality of live playback and record options for the captured spectral data range.

14. The system of claim 10, wherein the user interface is configured to provide a magnification function configured to magnify a selected area of the captured spectral data range.

15. A computer readable storage medium usable with a programmable computer, the computer readable storage medium comprising a program product having computer-readable code embodied therein for displaying data in a graphical format, the computer-readable code comprising instructions for:
providing a plurality of spectral data display and manipulation options on a display displaying spectral data via user interface software, wherein the plurality of spectral data display and manipulation options comprises providing a circular time bar display configured for cropping a data file;
displaying a pictorial representation of the spectral data display and manipulation options via a user interface processor; and
providing a plurality of manipulation instructions to the user interface processor to provide manipulation of the displayed spectral data via a user interface instruction engine,
wherein the plurality of data display and manipulation instructions are received from a control device connected to a computing system and the manipulation of the displayed spectral data is based on a user response to the displayed spectral data manipulation options or a pre-determined selection of the displayed spectral data display manipulation options.

16. The computer readable storage medium of claim 15, wherein the plurality of data display and manipulation options comprise a plurality of collapsible control groups configured to expand and contract to display or hide a set of controls located within on of plurality of collapsible control groups.

17. The computer readable storage medium of claim 15, wherein the plurality of data display and manipulation options comprise a playback options interface configured to provide playback options including pause, rewind, advance, and live playback of the displayed spectral data.

18. The computer readable storage medium of claim 15, wherein the plurality of data display and manipulation options comprises a plurality of recording options for captured and displayed spectral data.

* * * * *